3,053,831
DIALKOXYNAPHTHYL PENICILLINS

Scott J. Childress, Newtown Square, and Albert A. Mascitti, Norristown, Pa., assignors to American Home Products Corporation, New York, N.Y., a corporation of Delaware
No Drawing. Filed May 5, 1961, Ser. No. 107,944
5 Claims. (Cl. 260—239.1)

This invention relates to new synthetic compounds of value as antibacterial agents, as nutritional supplements in animal feeds, and as therapeutic agents in both veterinary and human medicine for treatment of infectious diseases caused by gram-positive bacteria; more particularly it relates to novel 6-acylaminopenicillanic acid compounds.

Antibacterial agents of the penicillin family have proved highly effective in the past in the therapy of bacterial infections, but in recent years it has been found that numerous penicillin-resistant strains of pathogenic bacteria have emerged and have come to constitute a serious threat to health, particularly in hospital populations. Many strains of staphylococcus and streptococcus have recently been found to be resistant to currently available antibiotics, and accordingly pose a serious threat to public health. The compounds of the present invention exhibit unusually good activity against many of these strains, and are accordingly valuable in combatting infections caused by these organisms. The compounds of this invention are of very low toxicity towards mammalian species and are well-tolerated, even in very large dosages. They may be administered orally, but are preferably administered parenterally, as by intravenous or intramuscular injections, either as solutions or suspensions.

The novel 6-acylaminopenicillanic acid compounds of this invention may be represented by the formula

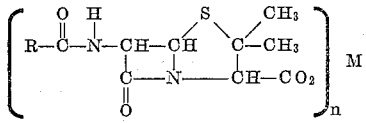

in which M represents hydrogen or a positive ion derived from an inorganic or organic base (e.g., Na, K, Ca, Mg, Al, NH₄, substituted ammonium, etc.), $n$ is a small integer equal to the positive valence of M, and R represents a di-(lower alkoxy)-1-naphthyl radical. Particularly valuable are the products in which R represents a dimethoxy-1-naphthyl radical in which one of the methoxy radicals is in the 2-position.

The new synthetic penicillins of this invention may be prepared conveniently by N-acylation of 6-aminopenicillanic acid, using a suitable acylating agent, such as a di-(lower alkoxy)-1-naphthoyl halide, a di-(lower alkoxy)-1-naphthoyl azide, or a di-(lower alkoxy)-1-naphthoyloxy alkyl carbonate. Another method that can be used is the reaction of a di-(lower alkoxy)-1-naphthoic acid with 6-aminopenicillanic and in the presence of reagents such as dicyclohexyl carbodiimide, 1-cyclohexyl 3-[2-morpholinyl-(4) ethyl] carbodiimide, etc. We prefer use of a di-(lower alkoxy)-1-naphthoyl chloride.

A convenient method of conducting this acylation comprises suspending 6-aminopenicillanic acid in a suitable inert reaction medium, adding at least an equivalent amount of a tertiary amine, and then adding slowly and with good agitation the acid chloride. The reaction may be conducted at room temperature, below room temperature, or even above room temperature; however, since 6-aminopenicillanic acid and its acylation products may undergo decomposition at elevated temperatures, it is preferred to operate below about 50° C., preferably at about room temperature or below. The reaction medium employed should be a solvent for the acid halide and the tertiary amine employed and should be free of reactive hydrogen atoms. Among suitable solvents for employment as the reaction medium are chloroform, methylene chloride, dioxane, dimethyl formamide, acetone, toluene, and methylethylketone. Because of their very desirable solvent powers, volatility, inertness, and water-immiscibility, we prefer to employ chloroform or methylene chloride as the acylation medium. As above stated, a tertiary amine is employed in this preferred method of acylation; this is to react with the co-produced hydrogen halide. Triethylamine is very suitable, but other tertiary amines may be employed instead, such as tributylamine, pyridine, dimethylaniline, N-ethylmorpholine, N-ethylpiperidine, etc.

It is ordinarily sufficient to add the acid halide at room temperature to a suspension of the 6-aminopenicillanic acid in the reaction medium (e.g., chloroform) containing the tertiary amine (e.g., triethylamine), and stir for about five to ten minutes. The reaction mixture may then be washed with acidulated water, extracted with aqueous sodium bicarbonate solution, and the extract worked up to recover the 6-acylaminopenicillanic acid compound.

The acylation product is normally recovered from the reaction mixture in which it is formed either as the free acid or as a salt, suitably the potassium or sodium salt. As is usual in the penicillin series, the free acids do not crystallize well and are sometimes obtained as resinous materials without a sharp melting point. The salts of our novel 6-acylaminopenicillanic acids, however, crystallize very well. The alkali metal salts may be obtained crystalline by concentrating their aqueous solutions or by adding ether to their acetone solutions.

If desired, the salts may be converted by metathetic reaction to other salts. Thus, by mixing an aqueous solution of the potassium salt of one of the new penicillins of this invention with an aqueous solution of the acetate of N,N'-dibenzylethylenediamine, one obtains a crystalline precipitate of the dibenzylethylenediamine salt of the new penicillin. Other salts, if desired, may be prepared similarly. Thus by mixing a concentrated aqueous solution of the potassium or sodium salt of one of our new 6-acylaminopenicillanic acids with an aqueous solution of dibenzylamine acetate, we obtain a precipitate of the corresponding dibenzylamine penicillin. By using N,N'-diabietyl ethylene diamine acetate, we obtain crystals of the diabietyl ethylene diamine penicillin. In like manner, there may be obtained salts of our novel 6-acylaminopenicillanic acids with other non-toxic amines such as triethylamine, procaine, N-benzyl-beta-phenethylamine, benzhydrylamine, 1-ephenamine, dehydroabietylamine, N-(lower) alkylpiperidines, and other amines which have been used to form salts with penicillins.

It is to be noted that by the expression "6-acylaminopenicillanic acid compounds," as used herein, we intend not merely the acids but also their non-toxic and pharmaceutically acceptable metal (e.g., sodium, potassium, calcium, magnesium, aluminum, etc.) and ammonium salts, including salts of organic amines, quaternary ammonium salts and salts of complex polyfunctional amines such, for example, as N,N'-dibenzylethylenediamine. As is well known, it is frequently preferred in therapeutic applications of penicillin to employ it in a sparingly soluble form in order to prolong its retention in the body and maintain therapeutically effective concentrations in the blood for a prolonged period. To this end, it is common practice to employ penicillin salts of relatively high-molecular weight amines. Among the most satisfactory and widely used forms have been the penicillin salts of N,N'-dibenzylethylenediamine. Various penicillin salts of rosin amines have also been suggested, as have many other salts formed from various penicillins and high-molecular weight pharmacologically acceptable amines. As above pointed out, the novel penicillins of this invention may be converted to such relatively slightly soluble amine salts to provide lengthened time of retention and maintenance of satisfactory blood levels in the animal or human organism.

The following examples, intended to be illustrative only, will serve to show how this invention may be practiced.

*Example 1*

2,8-dimethoxy-1-naphthaldehyde (2 g.) was dissolved in 100 ml. of acetone, 40 ml. of 20% sodium carbonate added, followed by 1.6 g. of potassium permanganate and the mixture stirred overnight at room temperature. Excess permanganate was destroyed by addition of hydrogen peroxide and the mixture filtered. The filtered precipitate was washed with dilute sodium carbonate and the washings added to the original filtrate. The acetone was removed by heating and the resulting aqueous suspension filtered from unreacted aldehyde. Acidification of the alkaline filtrate with hydrochloric acid gave white crystals that were recrystallized from methyl ethyl ketone. The crystals of 2,8-dimethoxy-1-naphthoic acid melted at 234–235.5°.

*Example 2*

To a suspension of 1 g. of 6-amino-penicillanic acid in 30 ml. of alcohol-free chloroform containing 1 g. of triethylamine was added a chloroform solution of the acid chloride prepared by treatment of 2,8-dimethoxy-1-naphthoic acid with excess thionyl chloride followed by evaporation of the excess reagent. After stirring for twenty minutes, the mixture was washed with very dilute acid until the wash liquor reached pH 2. The chloroform layer was shaken with dilute sodium bicarbonate solution until no more product could be removed. The aqueous layer was covered with 15 ml. of methyl isobutyl ketone and slowly acidified to pH 2 with shaking. The organic solution was dried over magnesium sulfate and treated with a slight excess of a 2 N solution of potassium 2-ethylhexoate in methyl isobutyl ketone. A gum separated that solidified upon trituration with ether. This compound proved to be 6-(2,8-dimethoxy-1-naphthamido)-penicillanic acid, potassium salt, melting above 170° with the decomposition. It absorbs strongly in the infrared at $5.66\mu$ and $6.59\mu$.

*Example 3*

2,3-dihydroxynaphthalene (25 g.) and anhydrous zinc cyanide (26.4 g.) in 400 ml. of anhydrous ether was treated with hydrogen chloride for 1½ hrs. An oil separated and then solidified. The ether was decanted off and 400 ml. of water added. Refluxing for ½ hr. effected solution. Cooling afforded crystals that were separated and recrystallized from aqueous methanol. A second crystallization from methyl ethyl ketone-petroleum ether gave 2,3-dihydroxy naphthaldehyde, M.P. 139–141°.

*Example 4*

A mixture of 12.7 g. of 2,3-dihydroxy-naphthaldehyde, 21.2 g. of potassium carbonate, 22 ml. of dimethyl sulfate and 200 ml. of acetone was stirred and heated under reflux for 28 hrs. The acetone was removed in vacuo, water was added and heated for a short period. The cooled mixture was extracted with ether, evaporation of which left crude 2,3-dimethoxynaphthaldehyde. Recrystallization gave material melting 154–158°.

*Example 5*

2,3-dimethoxy naphthaldehyde was oxidized to 2,3-dimethoxy naphthoic acid as described in Example 1. The product from ethyl acetate-hexane melted at 153–155°.

*Example 6*

6-(2,3 - dimethoxy-1-naphthamido)-penicillanic acid, potassium salt, was prepared by method of Example 2 except that methylene chloride replaced chloroform as solvent. The product decomposed above 170°. It absorbs strongly in the infrared at $5.66\mu$ and $6.63\mu$.

*Example 7*

2,7-dihydroxy naphthaldehyde was made from 2,7-dihydroxynaphthalene by the method of Example 3. In this case it was necessary to add some alcohol to bring about complete solution during the hydrolysis of the intermediate imide chloride. The product was recrystallized from ethyl acetate-hexane whereupon it melted at 162–164°.

*Example 8*

Methylation of 2,7-dihydroxynaphthaldehyde was effected by the method of Example 4 giving 2,7-dimethoxynaphthaldehyde which upon recrystallization from ethyl acetate melted at 96–97°.

*Example 9*

2,7-dimethoxynaphthoic acid was prepared by the method of Example 1. After recrystallization from ethyl acetatehexane it melted at 111–113°.

*Example 10*

The potassium salt of 6-(2,7-dimethoxy-1-naphthamido)-penicillanic acid was made according to Example 6. It melted with decomposition above 150°, and absorbs strongly in the infrared at $5.66\mu$ and $6.62\mu$.

*Example 11*

2,4-dihydroxynaphthaldehyde was synthesized from 1,3-dihydroxynaphthalene according to Example 3. Recrystallization from aqueous methanol gave material with M.P. 209–214° dec.

*Example 12*

Methylation of 2,4-dihydroxynaphthaldehyde to 2,4-dimethoxynaphthaldehyde was brought about by following Example 4. The product melted at 161–164°.

*Example 13*

Oxidation as in Example 1 converted 2,4-dimethoxynaphthaldehyde to the corresponding carboxylic acid melting at 181–183° after recrystallization from aqueous alcohol.

*Example 14*

The potassium salt of 6-(2,4-dimethoxy-1-naphthamido) penicillanic acid was prepared as described in Example 6. It melted at 200–205° dec. It absorbs strongly in the infrared at $5.68\mu$ and $6.62\mu$.

What is claimed is:
1. A compound selected from the group consisting of 6-[di-(lower alkoxy)-1-naphthamido]-penicillanic acids and the alkali metal salts of said acids.
2. The potassium salt of 6-(2,3-dimethoxy-1-naphthamido)-penicillanic acid.
3. The potassium salt of 6-(2,4-dimethoxy-1-naphthamido)-penicillanic acid.
4. The potassium salt of 6-(2,7-dimethoxy-1-naphthamido)-penicillanic acid.
5. The potassium salt of 6-(2,8-dimethoxy-1-naphthamido)-penicillanic acid.

References Cited in the file of this patent

UNITED STATES PATENTS 2,941,995    Doyle et al. _____ June 21, 1960

FOREIGN PATENTS 569,728    Belgium _____ Nov. 15, 1958